(12) United States Patent
Fannin et al.

(10) Patent No.: US 9,033,681 B2
(45) Date of Patent: May 19, 2015

(54) CONTROL VALVE BODY WITH INTEGRATED PUMP FOR AUTOMATIC TRANSMISSIONS

(75) Inventors: Michael P. Fannin, Brighton, MI (US); John A. Diemer, Farmington Hills, MI (US); Douglas John Dwenger, Plymouth, MI (US); Brian W. Whitmarsh, Commerce, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 729 days.

(21) Appl. No.: 12/603,318

(22) Filed: Oct. 21, 2009

(65) Prior Publication Data
US 2011/0088796 A1 Apr. 21, 2011

(51) Int. Cl.
| | |
|---|---|
| F04B 49/03 | (2006.01) |
| F04B 17/05 | (2006.01) |
| F16H 31/00 | (2006.01) |
| F04C 2/344 | (2006.01) |
| F16H 61/00 | (2006.01) |
| F04C 11/00 | (2006.01) |
| F04C 13/00 | (2006.01) |
| F04C 14/02 | (2006.01) |
| F04C 14/24 | (2006.01) |
| F04C 15/00 | (2006.01) |
| F04C 23/02 | (2006.01) |

(52) U.S. Cl.
CPC .......... F04C 2/3446 (2013.01); F16H 61/0025 (2013.01); F04C 11/001 (2013.01); F04C 13/00 (2013.01); F04C 14/02 (2013.01); F04C 14/24 (2013.01); F04C 15/0061 (2013.01); F04C 15/008 (2013.01); F04C 23/02 (2013.01)

(58) Field of Classification Search
CPC .............................. F04B 9/02; F16H 61/0025
USPC ........... 417/362, 220; 474/152; 475/182, 136, 475/137, 116, 123, 159; 137/565.01; 477/36, 44; 184/6.5, 6.12, 6.13, 6.28, 184/26, 27.1, 31
See application file for complete search history.

(56) References Cited

U.S. PATENT DOCUMENTS

| | | | | |
|---|---|---|---|---|
| 2,787,959 | A * | 4/1957 | Jeannin et al. | 417/362 |
| 3,430,517 | A * | 3/1969 | Glamann | 475/59 |
| 3,859,872 | A * | 1/1975 | Clauss, Jr. | 475/60 |
| 3,905,251 | A * | 9/1975 | Greene | 475/72 |
| 4,015,483 | A * | 4/1977 | Warner | 184/6.12 |
| 4,048,871 | A * | 9/1977 | Fyock | 475/107 |
| 4,274,303 | A * | 6/1981 | Shindo et al. | 475/59 |
| 4,454,786 | A * | 6/1984 | Stockton | 475/54 |
| 4,805,490 | A * | 2/1989 | Fuehrer et al. | 74/606 R |
| 5,078,106 | A * | 1/1992 | Matsuo et al. | 123/196 R |
| 5,544,540 | A * | 8/1996 | Holman | 74/467 |
| 6,189,396 | B1 * | 2/2001 | Barnreiter et al. | 74/335 |
| 6,227,333 | B1 * | 5/2001 | Scheib et al. | 184/6.22 |

(Continued)

Primary Examiner — Alexander Comley

(57) ABSTRACT

An integrated control valve body and hydraulic pump for an automatic transmission includes a control valve body having a plurality of control valves and passageways and an internal cavity having an inlet and an outlet, a pump rotor received within the internal cavity and having a plurality of radially and axially extending slots, radially moveable vanes and a shaft, and a device for transferring drive energy from a drive shaft extending between an output of a torque converter and an input of the transmission to the shaft of the hydraulic pump. The device for transferring drive energy may be a pair of chain sprockets and a chain, a pair of spur or helical gears or other inter-axis power transfer components and may affect a speed increase or reduction.

20 Claims, 4 Drawing Sheets

(56) References Cited

U.S. PATENT DOCUMENTS

| | | | |
|---|---|---|---|
| 6,530,856 B1 * | 3/2003 | Kakiage | 475/123 |
| 6,565,473 B2 * | 5/2003 | Endo et al. | 475/117 |
| 6,695,748 B2 * | 2/2004 | Kopec et al. | 477/130 |
| 6,881,165 B2 * | 4/2005 | Endo et al. | 474/28 |
| 7,240,657 B2 * | 7/2007 | Watanabe | 123/196 R |
| 7,247,114 B2 * | 7/2007 | Kaneda et al. | 475/116 |
| 7,278,833 B2 * | 10/2007 | Higashiyama et al. | 417/362 |
| 7,757,816 B2 * | 7/2010 | Bar et al. | 184/6.28 |
| 2005/0096171 A1 * | 5/2005 | Brown et al. | 475/116 |
| 2005/0129528 A1 * | 6/2005 | Hunter et al. | 417/199.1 |
| 2005/0255954 A1 * | 11/2005 | Ishikawa et al. | 474/152 |
| 2006/0054412 A1 * | 3/2006 | Takahashi et al. | 184/6.28 |
| 2006/0065486 A1 * | 3/2006 | Matsubara et al. | 184/6.12 |
| 2006/0068963 A1 * | 3/2006 | Sugano et al. | 475/206 |
| 2007/0117665 A1 * | 5/2007 | Yamazaki | 474/28 |
| 2007/0277751 A1 * | 12/2007 | Lin et al. | 123/41.44 |

* cited by examiner

CONTROL VALVE BODY WITH INTEGRATED PUMP FOR AUTOMATIC TRANSMISSIONS

FIELD

The present disclosure relates to hydraulic pump assemblies for automatic transmissions and more particularly an integrated control valve body and hydraulic pump for automatic transmissions.

BACKGROUND

The statements in this section merely provide background information related to the present disclosure and may or may not constitute prior art.

Currently, the vast majority of passenger car and light truck automatic transmissions utilize a plurality of planetary gear assemblies and sequenced, hydraulically operated clutches and brakes to provide four, five, six or more forward speeds or gears and reverse. The hydraulic fluid which circulates in the transmission is drawn from a sump, pressurized by a gear, vane or gerotor pump and provided to a control valve body having a plurality of control valves which direct the pressurized hydraulic fluid to the appropriate clutch and brake actuator at the appropriate time to achieve a desired gear.

The hydraulic pump is typically mounted around and driven by the shaft coupling the output of the torque converter with the input of the transmission. As such, the pump requires a separate, dedicated housing disposed about the transmission input shaft axis. Moreover, this housing occupies and may increase the axial length of the transmission, never a desirable outcome. Additionally, since it is well above the sump, it is necessary to include a suction line which communicates with the sump as well as a return or supply line which communicates with the valve body. Not only does the difference in height occasionally present priming issues but also the fluid lines result in pressure and energy losses. Finally, the weight and cost of such a stand-alone component is undesirable.

SUMMARY

The present invention provides an integrated control valve body and hydraulic pump for an automatic transmission having a drive shaft extending between an output of a torque converter and an input of the transmission which defines a first axis, a control valve body having a plurality of control valves and passageways and an internal cavity having an inlet and an outlet, a pump rotor received within the internal cavity and having a plurality of radially and axially extending slots, a plurality of radially moveable vanes and a shaft defining a second axis parallel to and spaced from said first axis, and means for transferring drive energy from the drive shaft to the shaft of the hydraulic pump. The means for transferring drive energy may be a pair of chain sprockets and a chain, a pair of spur or helical gears or other inter-axis power transfer components. The disposition of the pump in the control body, near the bottom of the transmission, reduces suction and supply line losses, improves pump efficiency and reduces weight by eliminating the conventional, stand-alone pump housing.

Thus it is an object of the present invention to provide a hydraulic pump for an automatic transmission that is disposed in the control valve body.

It is a further object of the present invention to provide a hydraulic pump for an automatic transmission that reduces line losses and exhibits improved efficiency.

It is a still further object of the present invention to provide a hydraulic pump for an automatic transmission that is offset from the axis of the input drive shaft of the transmission.

It is a still further object of the present invention to provide a hydraulic pump for an automatic transmission that includes a chain sprocket on the transmission input shaft, a chain and a chain sprocket on a shaft of the hydraulic pump.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
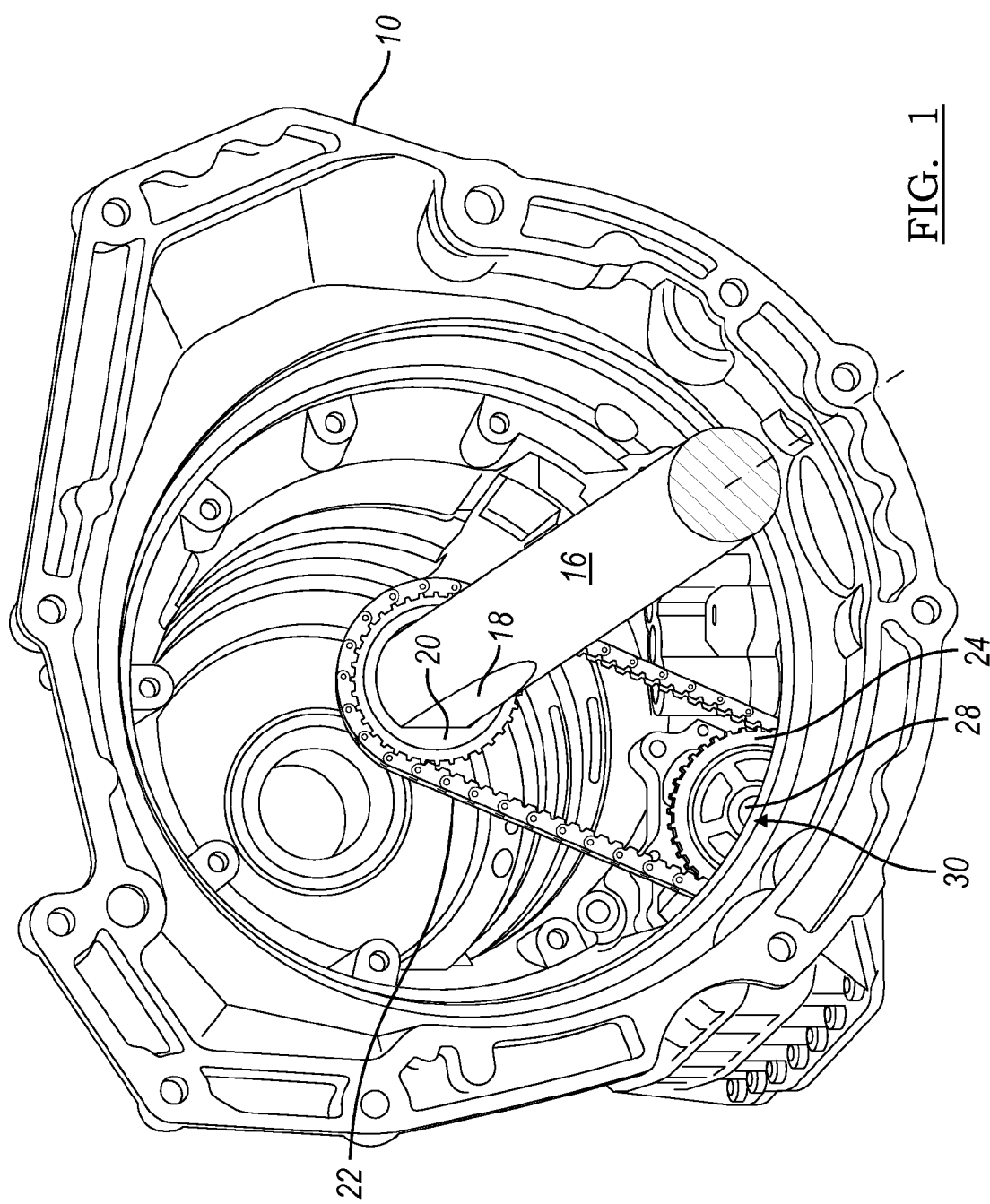
FIG. 1 is a front, perspective view of a housing of an automatic transmission incorporating the present invention.
Figure 2:
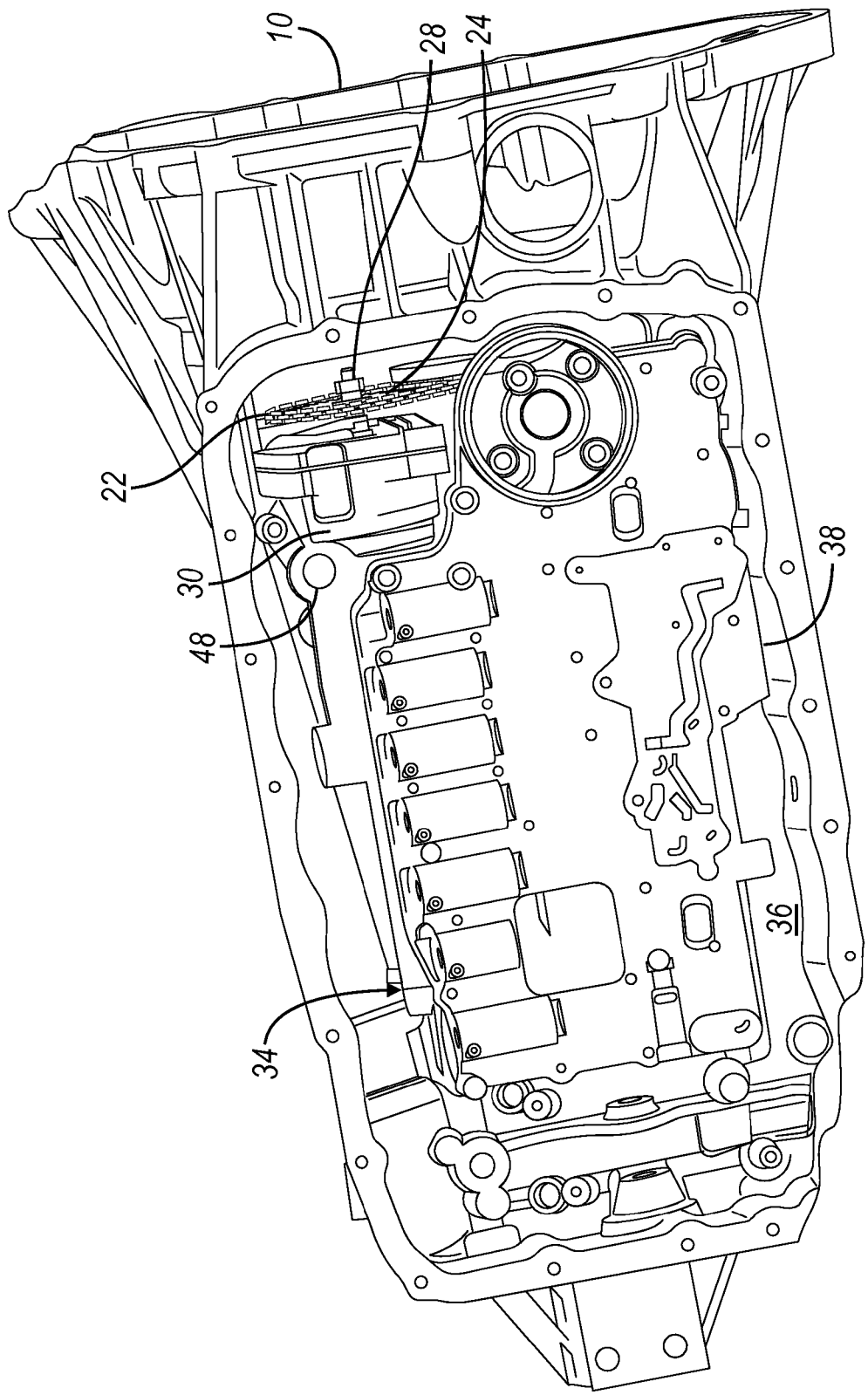
FIG. 2 is a bottom view of a control valve body of the automatic transmission of FIG. 1 incorporating the present invention.

With reference to FIGS. 1 and 2, a housing of a typical automatic transmission is illustrated and generally designated by the reference number 10. The transmission housing 10 is generally cast aluminum and includes openings, counterbores, flanges, shoulders and other features which receive, locate and support the various components of the automatic transmission. A drive shaft 16 is coupled to and driven by the output of a torque converter (not illustrated) and is coupled to and drives, for example, the input of a first gear set such as a planetary gear assembly (not illustrated). Attached to the drive shaft 16 by any suitable means such as, for example, complementary flats 18, interengaging splines, one or more drive pins or set screws, a friction fit or a combination of any of these elements is a first, chain drive sprocket 20. A multi-link drive chain 22 partially encircles and is driven by the chain drive sprocket 20 and partially encircles and drives a second, driven chain sprocket 24. The driven chain sprocket 24 is secured to and drives an input shaft 28 of a hydraulic pump 30.

It should be appreciated that other parallel axis power transfer components such as a pair of spur or helical gears may also be utilized to effect energy transfer from the axis of the drive shaft 16 to the axis of the input shaft 28. Moreover, it should also be noted that whereas in the conventional direct drive arrangement, the speed of the pump will and must always be the same as the speed of the input or drive shaft, this drive arrangement readily facilitates a rotational speed difference between the speed of the drive shaft 16 and the speed of the input shaft 28. For example to improve slow speed operation and priming, the first chain sprocket 20 may have a diameter larger than the diameter of the second chain sprocket 24, thereby increasing the relative rotational speed of the hydraulic pump 30. As those familiar with chain and gear drive assemblies will readily understand, if it is desired that the hydraulic pump 30 rotate more slowly than the drive shaft 16, the larger and smaller diameter drive members need only be interchanged.

Figure 4:
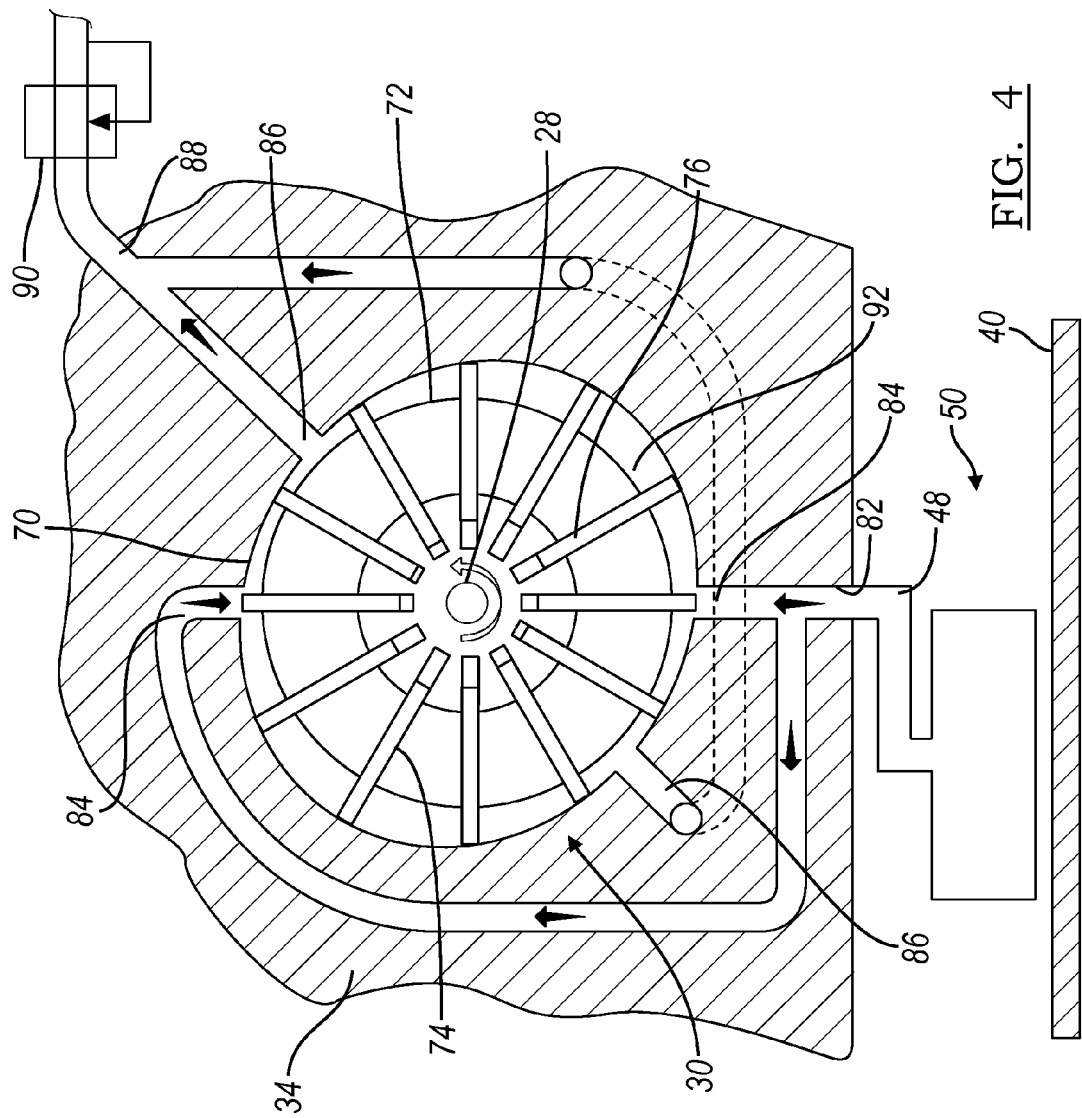
FIG. 4 is a schematic view of a vane pump according to the present invention.

The hydraulic pump 30 may be one of several configurations: it may be a constant volume vane pump, as illustrated in FIG. 4, or a constant volume gear or gerotor pump or variable volume vane pump. The hydraulic pump 30 is housed within a control valve body 34 which is typically disposed proximate the bottom of the transmission housing 10 and is accessible through a relatively large rectangular opening 36 having a peripheral flange 38.

Figure 3:
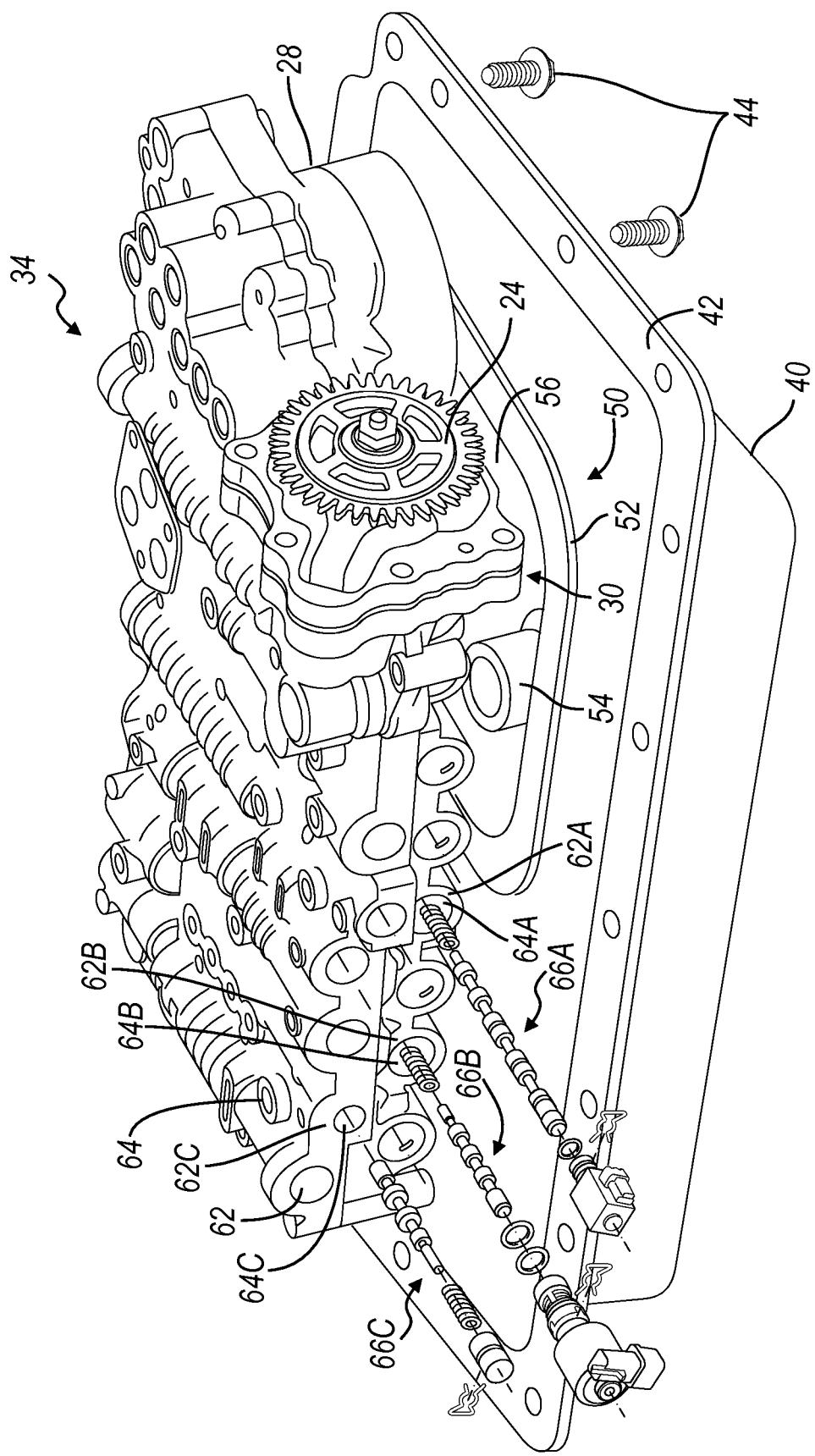
FIG. 3 is a perspective view of a valve body of the automatic transmission of FIGS. 1 and 2 incorporating the present invention.

Referring now to FIGS. 2 and 3, the rectangular opening 36 is closed off and sealed by a sump cover or bottom pan 40 having a peripheral flange 42 and which is secured to the transmission housing 10 by a plurality of threaded fasteners 44. The control valve body 34 includes a suction or inlet port 48 which is in fluid communication with a filter assembly 50. The filter assembly 50 preferably includes a rigid frame 52, an outlet fitting 54 which may be coupled or secured to the suction or inlet port 48 of the control valve body 34 and one or more layers of a filtration material of fabric 56 which filters out foreign particulate matter suspended in the hydraulic fluid. Preferably, as well, the filter assembly 50 is disposed at the bottom of the sump cover or bottom pan 40 such that it will always be submerged in and be supplied with hydraulic fluid from the pan 40.

The control valve body 34 includes a plurality of ports 62 and passageways 64 which receive and provide fluid communication between various hydraulic control components such as spool and logic valves, solenoid control valves, pressure regulators and filters. For example, a first port 62A and a first passageway 64A receive a first solenoid operated logic valve spool 66A which may control and achieve a shift such as the shift between first and second gears, for example. A second port 62B and a second passageway 64B receive a second solenoid controlled valve spool 66B which may regulate hydraulic pressure in response to a torque signal. A third port 62C and a third passageway 64C receive a third valve spool 66C which may be associated with and control the actuator feed limit pressure. Numerous other valves, spools, solenoid operators and passageways will typically also be incorporated into the control valve body 34.

Referring now to FIGS. 3 and 4, the control valve body 34 defines an internal cylindrical volume or cavity 70 which receives the hydraulic pump 30. The input shaft 28 of the hydraulic vane pump 30 is coupled to and drives a rotor 72 within the cavity 70 which defines a plurality of radially and axially extending slots 74 which preferably each slidably receive a vane 76. Typically, there are between four and ten slots 74 and vanes 76. The control valve body 34 defines an inlet passageway 82 which communicates with two inlet ports 84 and a pair of outlet ports 86 which communicate with an outlet passageway 88. A pressure regulator 90 preferably resides in the outlet passageway 88. The hydraulic vane pump 30 may either be a constant volume (displacement), balanced type such as illustrated in FIG. 4, a gear or gerotor type, an unbalanced constant displacement vane type or a variable volume (displacement) vane type.

In addition to reduced fluid losses due to the proximity of the hydraulic vane pump 30 to the sump, the present invention improves space utilization by permitting an axial reduction in the overall length of the transmission. Further more, because the hydraulic vane pump 30 is now contained in the control valve body 34, there is reduced noise and vibration emanating from the transmission housing 10.

The description of the invention is merely exemplary in nature and variations that do not depart from the gist of the invention are intended to be within the scope of the invention. Such variations are not to be regarded as a departure from the spirit and scope of the invention.

What is claimed is:

1. An integrated valve body and pump for an automatic transmission comprising, in combination, a drive shaft and a chain drive sprocket secured to said drive shaft, a driven chain sprocket and a chain rotationally coupling said drive and said driven chain sprockets, a transmission control valve body that defines a plane and is disposed within a transmission casing, the transmission control valve body having a first solenoid operated logic valve spool configured to control a shift, a second solenoid controlled valve spool configured to regulate hydraulic pressure in response to a torque signal, a third valve spool configured to control an actuator feed limit pressure, and a plurality of passageways, and wherein the transmission control valve body has a side surface substantially perpendicular to the plane and which surrounds an internal volume having an inlet and an outlet, a pump rotor received within said internal volume, said pump rotor having a shaft coupled to said driven chain sprocket, wherein the pump rotor defines an axis of rotation, and wherein longitudinal axes of each of said first valve spool, second valve spool, and third valve spool are disposed on the plane of the transmission control valve body and perpendicular to the axis of rotation of the pump rotor and a longitudinal axis of said inlet is perpendicular to said plane of said transmission control valve body and perpendicular to said axis of rotation of said pump rotor.

2. The integrated valve body and pump of claim 1 wherein said inlet is in fluid communication with a sump.

3. The integrated valve body and pump of claim 1 wherein said outlet is in fluid communication with the first solenoid operated logic valve spool, the second solenoid controlled valve spool, and the third valve spool.

4. The integrated valve body and pump of claim 1 wherein said pump rotor includes a plurality of radially oriented vanes.

5. The integrated valve body and pump of claim 1 wherein said drive shaft is driven by an output of a torque converter.

6. The integrated valve body and pump of claim 1 further including a pan which defines a sump.

7. The integrated valve body and pump of claim 1 wherein said drive and said driven sprockets have different diameters.

8. An integrated control valve body and pump for an automatic transmission comprising, in combination, a transmission control valve body that defines a plane and is disposed within a transmission casing and having a first solenoid operated logic valve spool configured to control a shift, a second solenoid controlled valve spool configured to regulate hydraulic pressure in response to a torque signal, a third valve spool configured to control an actuator feed limit pressure, and a plurality of passageways, wherein the transmission control valve body includes a side surface substantially perpendicular to the plane and which surrounds an internal cavity having an inlet and an outlet, a chain sprocket, a pump rotor received within said internal cavity having a shaft coupled to said chain sprocket, said pump rotor having a plurality of radially oriented and axially extending slots, wherein said pump rotor defines an axis of rotation and a vane received in at least one of said slots, and wherein longitudinal axes of each of said first valve spool, second valve spool, and third valve spool are disposed on the plane of the transmission control valve body and perpendicular to the axis of rotation of the pump rotor and a longitudinal axis of said inlet is perpendicular to said plane of said transmission control valve body and perpendicular to said axis of rotation of said pump rotor.

9. The integrated valve body and pump of claim 8 further including a transmission input shaft, a chain sprocket disposed on said input shaft and a chain engaging said sprocket on said shaft of said pump and said sprocket on said input shaft.

10. The integrated valve body and pump of claim 8 further including a suction line in fluid communication with said internal cavity and a filter in fluid communication with said suction line.

11. The integrated valve body and pump of claim 8 wherein said pump rotor displaces a constant volume of hydraulic fluid per rotation.

12. The integrated valve body and pump of claim 8 wherein said pump rotor displaces a variable volume of hydraulic fluid per rotation.

13. The integrated valve body and pump of claim 8 further including an outlet port in fluid communication with said internal cavity and wherein said outlet port is in fluid communication with the first solenoid operated logic valve spool, the second solenoid controlled valve spool, and the third valve spool.

14. An integrated valve body and pump for an automatic transmission comprising, in combination, a drive shaft defining a first longitudinal axis, a transmission control valve body that defines a plane and is disposed within a transmission casing and having a plurality of passageways, a first solenoid operated logic valve spool configured to control a shift, a second solenoid controlled valve spool configured to regulate hydraulic pressure in response to a torque signal, and a third valve spool configured to control an actuator feed limit pressure, wherein the transmission control valve body has a side surface substantially perpendicular to the plane and which surrounds an internal volume having an inlet and an outlet, a pump rotor received within said internal volume, said pump rotor having a plurality of radially disposed slots and vanes and a shaft defining a second longitudinal axis parallel to and spaced from said first longitudinal axis, and means for transferring drive energy from said drive shaft to said shaft of said rotor, wherein longitudinal axes of each of said first valve spool, second valve spool, and third valve spool are disposed on the plane of the transmission control valve body and perpendicular to the axis of rotation of the pump rotor and a longitudinal axis of said inlet is perpendicular to said plane of said transmission control valve body and perpendicular to said second axis of said pump rotor.

15. The integrated valve body and pump of claim 14 wherein said means for transferring is a pair of chain sprockets and a chain.

16. The integrated valve body and pump of claim 14 wherein said means for transferring is a first, chain drive sprocket coupled to said drive shaft, a second, driven chain sprocket coupled to said shaft or said rotor and a chain engaging said sprockets.

17. The integrated valve body and pump of claim 14 further including a suction port in said valve body and an outlet port in said valve body, said ports in fluid communication with said internal volume.

18. The integrated valve body and pump of claim 14 wherein said means for transferring includes a drive member of a first diameter and a driven member of a second diameter whereby a speed change is effected between said drive shaft and said shaft of said pump rotor.

19. The integrated valve body and pump of claim 14 wherein said means for transferring includes a first chain sprocket having a first diameter disposed on said drive shaft and a second chain sprocket having a second diameter disposed on said shaft of said pump rotor and a chain, said first diameter being larger than said second diameter.

20. The integrated valve body and pump of claim 14 further including a suction port in said valve body in fluid communication with said internal volume and a fluid filter in fluid communication with said suction port.

* * * * *